United States Patent [19]

Castain

[11] Patent Number: 4,893,457
[45] Date of Patent: Jan. 16, 1990

[54] SAFETY BLADE FOR ROTARY GRASS TRIMMERS

[76] Inventor: Joseph S. Castain, 771 N. Market St., Opelousas, La. 70570

[21] Appl. No.: 264,075

[22] Filed: Oct. 28, 1988

[51] Int. Cl.$^4$ ............................................. A01D 55/18
[52] U.S. Cl. ...................................................... 56/295
[58] Field of Search ................. 56/295, 291, 289, 255, 56/17.5, 12.57; 30/347, 276, 240, 206, 205

[56] References Cited

U.S. PATENT DOCUMENTS

| | | | |
|---|---|---|---|
| 2,833,101 | 5/1958 | Batton | 56/295 X |
| 2,920,436 | 1/1960 | Benson | 56/295 |
| 3,078,573 | 2/1963 | Kern | 56/295 X |
| 3,103,094 | 9/1963 | Cook | 56/295 X |
| 3,425,199 | 2/1969 | Freedlander et al. | 56/295 |
| 3,614,861 | 10/1971 | Wickham et al. | 56/295 |
| 3,681,903 | 8/1972 | Phillips | 56/295 |
| 4,250,622 | 2/1981 | Houle | 56/295 X |
| 4,290,258 | 9/1981 | Gobler | 56/295 |
| 4,527,382 | 7/1985 | Aono | 56/295 |
| 4,706,446 | 11/1987 | Doi et al. | 56/295 |

OTHER PUBLICATIONS

8-Tooth Grass/Weed Blade; McCulloch Corporation; before 10/88.

Primary Examiner—Thuy M. Bui
Attorney, Agent, or Firm—Durio, McGoffin & Stagg

[57] ABSTRACT

A safety blade for rotary grass trimmers for cutting grass and weeds while avoiding the hazards of blade thrusting and of any loose debris being thrown by the spinning blade. The blade has a plurality of cutting vanes each with a rounded outside radial edge of varying radius which serves as a bumper as the blade spins. Each vane has upwardly beveled cutting edges which along with the rounded outside radial edge serves to nudge away, rather than lift and throw, any loose debris encountered by the spinning blade.

6 Claims, 4 Drawing Sheets

SAFETY BLADE FOR ROTARY GRASS TRIMMERS

FIELD OF INVENTION

This present invention relates to grass and weed trimming and, more particularly, presents a blade for use on rotary grass trimmers to allow cutting grass and weeds around curbs, sidewalks, shrubbery, and trees while eliminating or minimizing the risks of thrown gravel or other debris by the rotating blade.

BACKGROUND OF THE INVENTION

Conventional rotary blades used for grass and weed trimming present the serious risks of rocks, pebbles, sticks and other debris being thrown by the rotating blades. The risk of thrown debris is presented not only to the operator of the rotary trimmer but also to bystanders and even pets in the immediate vicinity. Attempts to solve the problem include the use of shields or shrouds around the rotating blade in order to deflect the flying debris. Use of the shields and shrouds do not fully protect against the hazards associated with the flying debris since a segment of the shield around the rotating blade must be left open to allow for convenient cutting.

Conventional metal cutting blades present the additional risk of severe cutting injuries to the user and others by virtue of the rapidly rotating exposed blades. When in motion the blades can engage a hard unyielding object such as a tree trunk or fence post causing the trimmer to kick out or thrust out of control of the operator. The thrusting spinning blade then presents a serious cutting hazard. Shields and shrouds used to protect against direct blade contact with unyielding objects and eliminate thrusting do not afford complete protection because an area must remain open to allow the blade to cut. Further, the shields or shrouds often interfere with and impede the cutting performance of the trimmer and can restrict the use of the trimmer by making it more difficult for the trimmer to fit into tight places or more difficult to turn the trimmer for use as an edger.

String trimmers designed to protect the user and others from cutting injuries do not solve the problem of thrown debris. Flying debris is still a significant problem when string trimmers are used in place of a rotating blade and shielding and shrouding is often necessary. Further, string trimmers do not have the capacity, strength and durability in most instances to cut heavy grass and small shrubbery. When the speed and diameter of the rotating string is increased to enhance the cutting capabilities of string trimmers there seems to be a corresponding increase in the incidence of thrown rocks and debris.

Attempts at providing non-metal cutting blades, such as those illustrated in U.S. Pat. No. 4,250,622 to E. R. Houle, to reduce the injury risks associated with rotating metal blades have been made. However, non-metal blades do not provide the necessary strength and durability for heavy use and conventional designs do not eliminate the hazard of thrown debris.

Thus, there has been a long need for a functional rotary trimmer blade with the cutting and durability inherent in a metal blade that eliminates or minimizes the hazards of debris being thrown by the rotating blades common to conventional rotary trimmer blades and string trimmers and at the same time reduce the risk of cutting injuries to the user and others in the vicinity often associated with blade thrusting.

SUMMARY OF THE INVENTION

The present invention provides a metal safety blade for grass and weed trimmers designed to satisfy the aforementioned needs. The cutting edges of the blade are set back from the rounded outside radial edge of the blade to avoid contact of the cutting edge with hard surfaces. The rounded outside radial edge of the blade is shaped so as to guide grass and weeds onto the cutting edges and to serve as a bumper to guide the spinning blade around hard unyielding objects such as fence posts and to nudge away any loose debris such as gravel or twigs. The blade incorporates a leveling or stabilizing bumper on the bottom surface to maintain the blade parallel with the grass surface above any small gravel and debris that may be encountered and the bevel of the cutting edge, along with the rounded outside radial edge, is designed to push away gravel and debris in the path of the spining blade rather than lift or throw the debris. Thus, the blade design eliminates or reduces the need for shielding the spinning blade to avoid thrown debris and to protect the operator from hazards associated with thrusting. This allows greater flexibility of use of the trimmer such as an edger or even as a garden hoe.

Accordingly, the present invention relates to a new and improved metal safety blade for grass rotary trimmers which comprises a unique shape and design that eliminates or greatly reduces the hazards of thrown debris while the blade is in use and further reduces the risks of contact of the cutting surface of the blades with unyielding objects such as fence posts, sidewalks, tree trunks, shrubbery, stones and large rocks avoiding the dangerous cutting hazards associated with thrusting of the spinning blade and loss of control by the operator.

DESCRIPTION OF THE PREFERRED EMBODIMENT(S)

Figure 1:
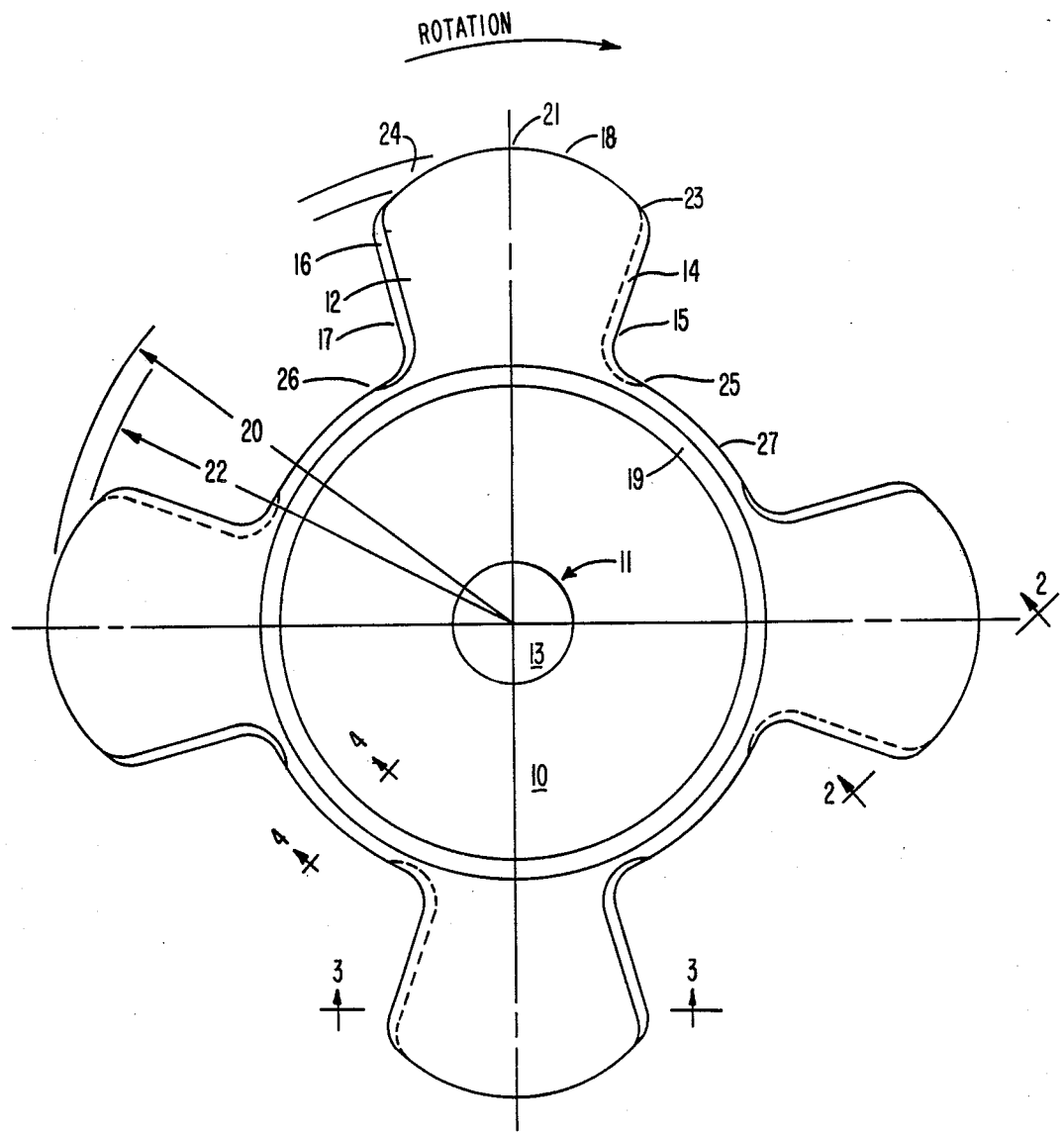
FIG. 1 is a plan view of the present invention.

Referring now to the drawings, and more particularly to FIG. 1, a rotary grass trimmer blade 10 is shown in plan view having an aperture means 11 for mounting blade 10 on the shaft of a rotary trimmer, a plurality of vanes 12 each vane extending radially from the center 13 of the blade 10 and uniformly spaced around the circumference of the blade 10 for balancing, each vane having a leading edge 15, a trailing edge 17, an inwardly curved cutting area 14 along the leading edge 15 beveled up from the bottom surface of each vane, an inwardly curved cutting area 16 along the trailing edge 17 beveled down from the top surface of each vane, a curved rounded outside radial edge 18 and a leveling and stabilizing bumper 19. The trailing cutting area 16 does not come into play in cutting when the blade is in the position shown.

The radius of the curve of the outside radial edge 18 from the center 13 of the blade 10 of each vane 12 varies from a maximum radius 20 at the mid-point 21 on the outside radial edge of the vane 12 and symmetrically reduces to a minimum radius 22 at both the leading radial point 23 and the trailing radial point 24 of the vane 12. The outside edge 18 is rounded and doe not serve as a cutting surface. The combination of the varying radius being greater at the vane mid-point than at the leading and trailing cutting edges and the rounded outside radial edge serve to provide a bumper as the blade spins to guide the blade around hard unyielding objects and to push away loose debris encountered by the spinning blade during operation. This bumper eliminates the problem of thrusting associated with conventional trimmer blades. Under this configuration the faster the blade spins the more frequent the outside radial edge 18 bumps against hard objects reducing the likelihood of thrusting. Under slower blade speeds the torque developed is insufficient to cause a significant thrusting hazard.

The leading cutting area 14 is beveled up from the bottom surface of the vane tapering from a starting point at the leading radial point 23 to a finishing point 25 on the inside radial edge 27 of the blade 10. The trailing cutting area 16 is beveled down from the top of the blade surface and tapers similarly from the trailing radial point 24 to point 26 on the inside radial edge 27 of the blade 10. This upwardly beveled cutting area on the leading edge pushes away gravel, pebbles and debris rather than causing the debris to be lifted by the spinning blade. In use, the blade is maintained essentially horizontal to the grass surface by the leveling and stabilizing bumper 19. This bumper 19 can support the weight of the rotary trimmer in use and raises the cutting edge above the ground surface to further reduce the possibility of debris being lifted and thrown by the spinning blade.

In this embodiment the blade can be turned over for additional use when the cutting edge 15 becomes dull. When turned over the unused trailing cutting edge 17 becomes the new leading cutting edge and allows for prolonged life of the blade.

Figure 2:
FIG. 2 is a cross-section through the vane 12 of the blade showing the upward bevel of the cutting area 14 and the rounded outside radial edge 18 of the vane.

FIG. 2, a cross-section through a vane 12, shows the rounded outside radial edge 18 of the blade, the cutting edge 15 and the upwardly beveled cutting area 14. Cutting area 14 is beveled up from the bottom of the blade to form the cutting edge 15 at the top surface of the vane 12 to nudge away rather than lift and throw loose debris such as pebbles or gravel as the blade spins during operation. The outside radial edge 18 of the blade is rounded so as to guide grass and weeds to the cutting edge and act as a bumper as the blade moves against unyielding objects such as tree trunks, curbs and sidewalks. The bumper effect of the curved rounded radial edge 18 pushes away loose debris, protects the cutting edge 15, and guides the blade around hard objects during operation, thus greatly eliminating thrusting and the hazards associated with an out of control blade.

Figure 3:
FIG. 3 is a cross-section through the vane 12 of the blade showing the upwardly beveled leading cutting area 14 of the blade and the downwardly beveled trailing cutting area 16.

In FIG. 3, a cross-section through the vane 12, shows the upward and downward bevel, respectively, of the leading cutting area 14 and the trailing cutting area 16 of the blade. This illustrates the preferred embodiment of the invention which allows for the blade to be turned over for further use. This will prolong the life of the blade and extend the time between sharpening the edges. As the blade wears during use, it's proportional shape tends to reimburse constant. It is recommended that the blade be turned over intermittently during use to extend blade life.

Figure 4:
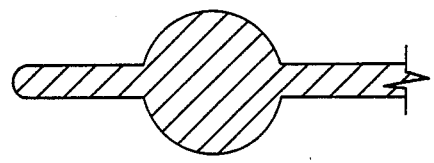
FIG. 4 is a cross-section through the blade 10 showing the leveling and stabilizing bumper 19 of the blade.

FIG. 4 is a cross-section through the blade showing the leveling and stabilizing bumper 19. This bumper 19 projects away from the surface of the blade 10. The bumper 19, here in the form of a continuous ring, serves to keep the blade 10 horizontal and parallel to the grass surface being cut as well as keeping the cutting edge 15 up above any debris on the ground. This slightly lifts the spinning blade to aid in keeping the debris from being lifted and thrown.

In use the rotary blade 10 is attached to the shaft of a conventional rotary trimmer. The rounded outside radial edge 18 of the vane 12 guides grass and weeds onto the leading cutting area 14. The shape of the vane 12, with its varying outside radius, rounded radial edge 18 and the smooth transition to the cutting area 14, serves as a bumper for the blade and guides the spinning blade around hard objects and surfaces. The upwardly beveled cutting area 14 allows gravel and debris to be nudged away from the spining blade rather than picked up and thrown.

Figure 5:
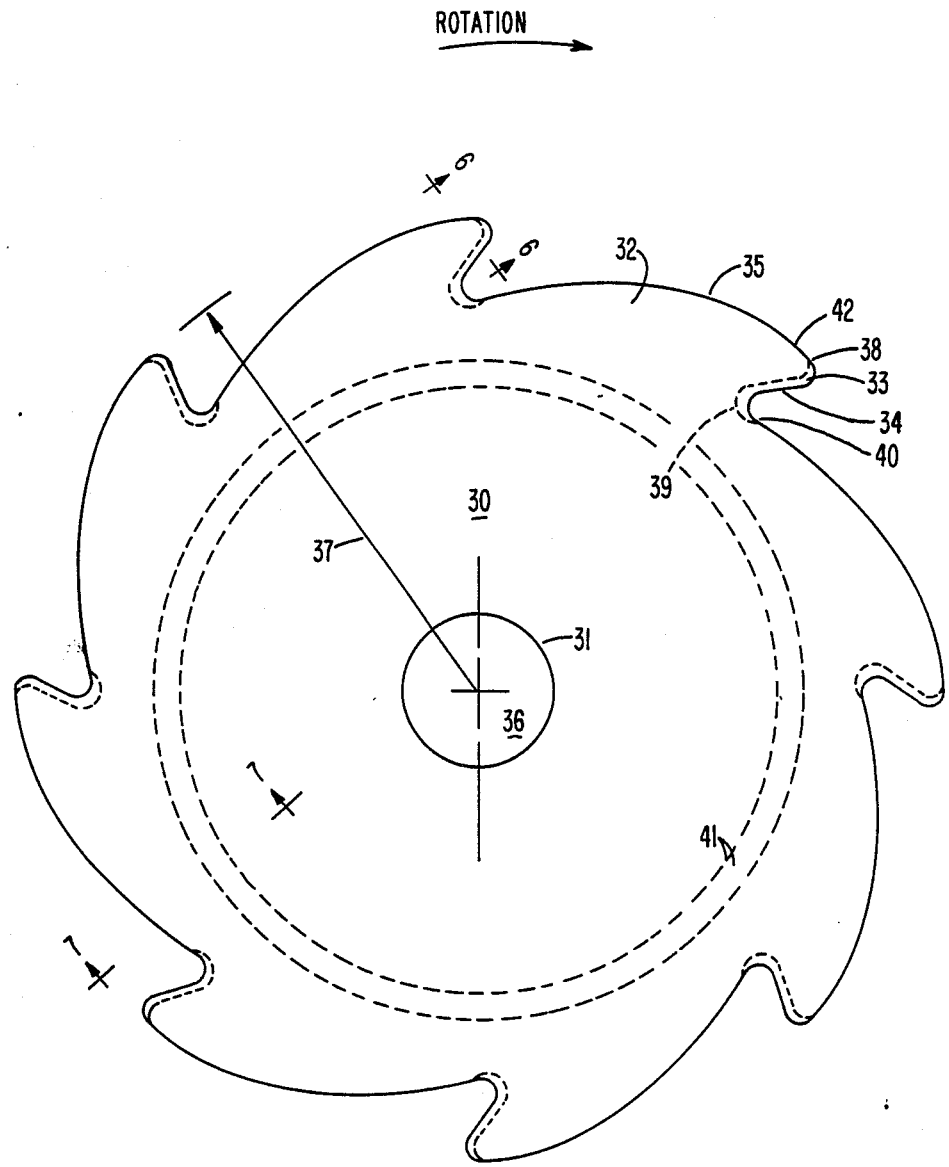
FIG. 5 is an alternate embodiment of the invention.

FIG. 5 illustrates a plan view of an alternate embodiment 30 of the invention. This embodiment has a means 31 for attaching the blade to the shaft of a rotary trimmer, a plurality of vanes 32, and a leveling and stabilizing bumper 41. Each vane 32 has a recessed upwardly beveled cutting area 33 on the inwardly curved leading edge 34 of the vane in the direction of blade rotation. Each vane 32 has a curved rounded outside radial edge 35 of varying radius having a leading end 38 and a trailing end 40 to serve as a bumper to guide the blade around hard objects.

The radius from the center of the blade 36 to the leading end 38 of the rounded outside radial edge 35 is less than the maximum radius 37 from the center of the blade 36 shown as point 42 on the outside radial edge. The position of point 42 may vary between the leading end 38 and the trailing end 40 of the outside radial edge but is always of greater radius from the center. The varying rounded outside radial edge 35 serves as a bumper when the blade comes against hard unyielding objects.

The cutting area 33 is upwardly beveled, tapering up from the leading end of the outside radial edge 38 and along and around the crook 39 of the leading edge 34 and tapers to the trailing end 40 on the outside radial edge of the adjacent vane. Thus, there is a smooth transition from the cutting area 33 to the rounded radial edge 35. This allows the alternative embodiment to work in the same manner as previously described.

Figure 6:
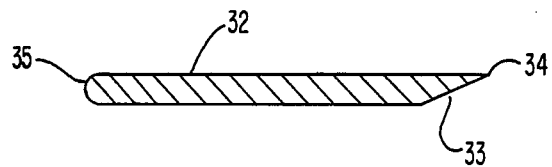
FIG. 6 is a cross-section through the vane of FIG. 5 showing the upwardly beveled cutting area 33 and the rounded outside radial edge 35.

FIG. 6 shows a cross-section through the vane 32 illustrating the rounded outside radial edge 35 and the upwardly beveled cutting area 33. The upwardly beveled cutting area coupled with the leveling and stabilizing ring 41 as described in FIG. 7 allows small debris to be nudged away from the spining blade rather than being picked up and thrown.

Figure 7:
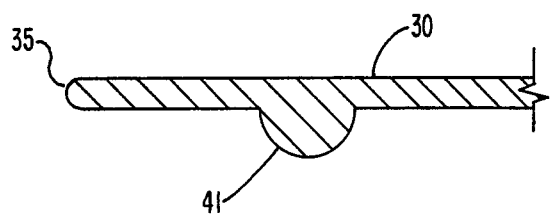
FIG. 7 is a cross-section through the blade showing the leveling and stabilizing bumper 41 on the bottom surface of the blade 30.

FIG. 7 is a partial section through the blade 30 showing the leveling and stabilizing bumper 41. This bumper projects away from the bottom surface of blade 10 and can vary in depth depending upon the use of the blade. In this embodiment the bumper is a continuous ring.

It is understood that the blade is to be used with conventional rotary trimmers, either gasoline or electrically powered, that incorporate a rotary shaft to spin the blade for cutting purposes. It is further understood that such a blade could be used for conventional lawn mowing machines with the same benefits. The blade is intended to be metal but the form and shape which give it its unique qualities could be incorporated into blades of other materials with the same claimed advantages.

It is thought that the blade for rotary grass trimmers and many of its attendant advantages will be understood from the foregoing description and it will be apparent that various changes may be made in form, construction, arrangement of the parts thereof without departing from the spirit and scope of the invention or sacrificing all of its material advantages, the form herein before described being merely illustrative of preferred embodiments of the invention.

I claim:

1. A safety blade for use with rotary grass trimmers for cutting grass and weeds around sidewalks, curbs, fence posts, other unyielding objects and loose debris, such as gravel, twigs and stones, comprising:
   (a) a disc shaped body;
   (b) a means for attaching said body at its center to the shaft of a rotary trimmer for rotation of said blade in a spinning manner;
   (c) a plurality of vanes mounted to said body and extending radially from the center of said body, each vane being uniformly separated spacedly from the other and having a leading edge in the direction of rotation of said blade said leading edge having a proximal end and a distal end;
   (d) a curved rounded outside radial edge for each vane adjacent to said leading edge having a varying radius along said radial edge from the center of said body, said varying radius being a minimum where said outside radial edge and said leading edge meet so as to allow said rounded outside radial edge to bump against said unyielding objects and loose debris as the blade rotates, nudging said blade away from the unyielding object and loose debris; and
   (e) a cutting area along said leading edge of each vane for cutting grass and weeds coming between said vanes during rotation, said cutting area being upwardly beveled to eliminate lifting and throwing of loose debris by the spining blade;

2. A safety blade for use with rotary grass trimmers as recited in claim 1, further comprising:
   a bumper mounted on the bottom surface of said body to maintain said blade essentially parallel to and elevated above the grass surface for supporting the weight of said rotary trimmer to keep said rotating blade above any small loose debris.

3. A safety blade for use with rotary grass trimmers for cutting grass and weed around sidewalks, curbs, fence posts, other unyielding object and loose debris, such as gravel, twigs and stones, comprising:
   (a) a disc shaped body having an upper face and a lower face;
   (b) a means for attaching said body at its center to the shaft of a rotary trimmer for rotation of said blade in a spinning manner;
   (c) a plurality of vanes mounted to said body and extending radially from the center of said body, each vane being uniformly separated spacedly from the other and each having a leading edge and a trailing edge in the direction of rotation, each leading edge and trailing edge having a proximal end and a distal end;
   (d) a curved rounded outside radial edge for each vane between and adjacent to said leading edge and said trailing edge, said outside radial edge having a varying radius from the center of said body, said varying radius being a minimum at the point where said outside radial edge meets said leading edge and said trailing edge and a maximum midway between those two points, so as to allow said rounded outside radial edge at its maximum radius to bump against said unyielding objects and loose debris as the blade rotates nudging said blade away from said unyielding objects and loose debris.
   (e) a cutting area along said leading edge of each vane for cutting grass and weeds passing between said vanes as the blade rotates, said cutting area being upwardly beveled to reduce the incidence of loose debris being lifted and thrown by said spinning blade;
   (f) a cutting area along said trailing edge of each vane, said cutting area being downwardly beveled so that said blade can be turned over for use when said cutting area along said leading edge becomes dull, said trailing edge then becoming the leading edge, to prolong blade life; and
   (g) a first bumper mounted to said upper face of said body and a second bumper mounted to said lower face of said body to maintain said blade essentially parallel to and above said grass surface for supporting the weight of said rotary trimmer and to maintain said spinning blade above any loose debris that may be encountered.

4. A safety blade for use with rotary grass trimmers as recited in claim 3, wherein:
   said first and second bumpers are continuous rings mounted to said body.

5. A safety blade for use with rotary grass trimmers for cutting grass and weeds around sidewalks, curbs, fence posts, other unyielding objects and loose debris, such as gravel, twigs and stones, comprising:
   (a) a disc shaped body having an upper face and a lower face;
   (b) a means for attaching said body at its center to the shaft of a rotary trimmer for rotation of said blade in a spinning manner;
   (c) a plurality of vanes mounted to said body and extending radially from the center of said body, each vane being uniformly separated spacedly from the other and each having a leading edge and a trailing edge in the direction of rotation, each leading edge and trailing edge having a proximal end and a distal end;
   (d) a curved rounded outside radial edge for each vane between and adjacent to said leading edge and said trailing edge, said outside radial edge having a varying radius from the center of said body, said varying radius being a minimum at the point where said outside radial edge meets said leading edge and said trailing edge and a maximum midway between those two points, so as to allow said rounded outside radial edge at its maximum radius to bump against said unyielding objects and loose debris as the blade rotates nudging said blade away from said unyielding objects and loose debris;

(e) a cutting area along said leading edge of each vane for cutting grass and weeds passing between said vanes as the blade rotates, said cutting area being upwardly beveled to produce a cutting edge at the upper face of said blade;

(f) a cutting area along said trailing edge of each vane, said cutting area being downwardly beveled to produce a cutting edge at the lower face of said blade so that said blade can be turned over for use when said cutting area along said leading edge becomes dull, said trailing edge then becoming the leading edge.

6. A safety blade for use with rotary grass trimmers as recited in claims 1, 3 and 5 wherein said blade is made of metal.

* * * * *